Oct. 27, 1953 C. W. SMITH ET AL 2,656,667
SEED HARVESTER HAVING FLEXIBLE STRIPPING MEANS
Filed Oct. 2, 1948 5 Sheets-Sheet 1

INVENTOR.
Chauncey W. Smith &
Milo F. Arms
BY
ATTORNEY

Oct. 27, 1953

C. W. SMITH ET AL 2,656,667

SEED HARVESTER HAVING FLEXIBLE STRIPPING MEANS

Filed Oct. 2, 1948

INVENTOR.
Chauncey W. Smith &
BY            Milo F. Arms

ATTORNEY

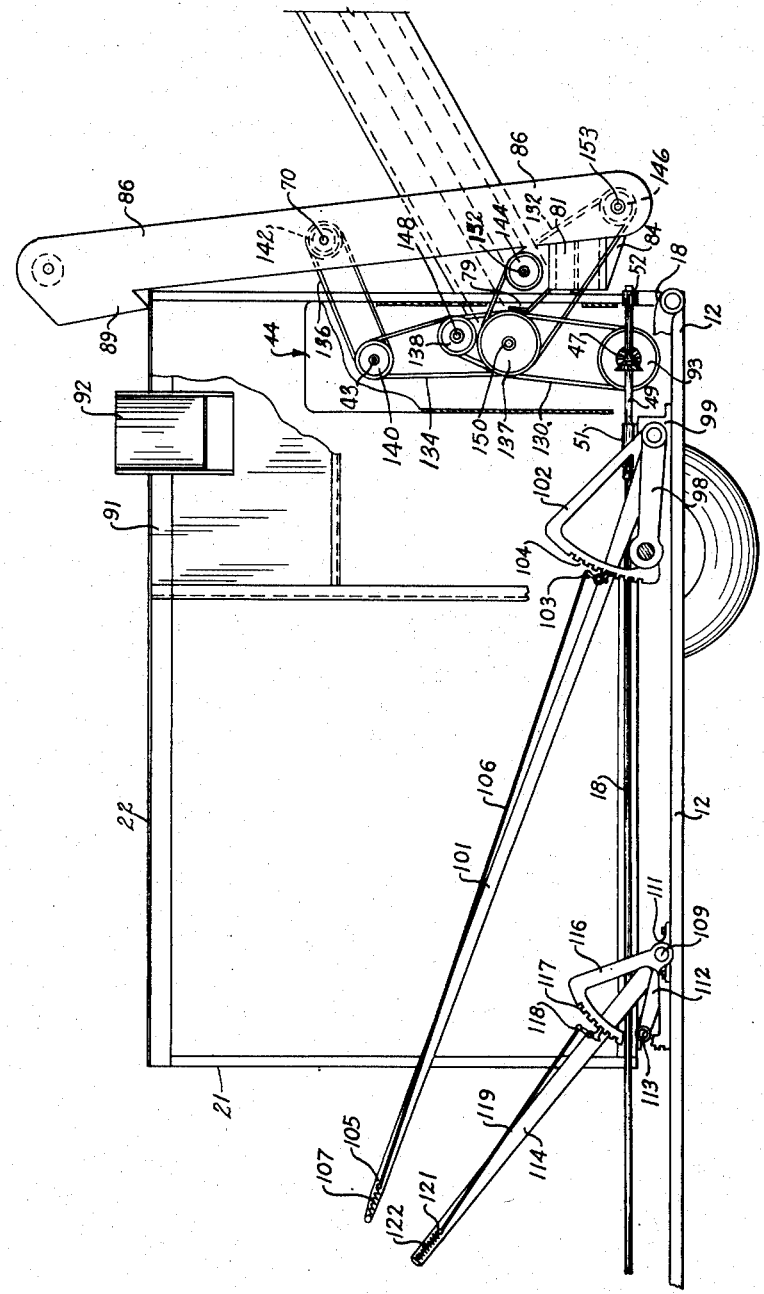

Patented Oct. 27, 1953

2,656,667

UNITED STATES PATENT OFFICE 2,656,667

SEED HARVESTER HAVING FLEXIBLE STRIPPING MEANS

Chauncey W. Smith and Milo F. Arms, Lincoln, Nebr., assignors, by mesne assignments, to Research Corporation, New York, N. Y., a corporation of New York Application October 2, 1948, Serial No. 52,486

5 Claims. (Cl. 56—126)

This invention pertains to a harvesting machine and more particularly to a seed harvester having flexible stripping means adapted to harvest and prepare castor seeds for market by processing castor seed plants planted in rows.

Though castor seed, for the most part, was formerly grown in foreign countries it has now been found that the plant is adaptable to growth in this country. One of the principal reasons why this crop has not been grown in greater quantity has been the lack of adequate crop harvesting machinery.

Previously it has been customary to prepare castor seed for market by manual operations of picking and cleaning the product or by cutting down the plant and subjecting it to a threshing operation. Such operations have not been entirely satisfactory for various reasons, and particulary because of the high cost of preparing the product for market under such conditions. In addition, threshing operations tend to destroy the plant fiber, making it unsuitable for further use. The present invention is intended to remedy such conditions.

It is an object of this invention to provide a mechanical harvester for seed pod or flower bearing plants that is efficient and economical to use.

It is a further object of this invention to provide a method for processing castor seed so as to obtain a clean separation between the castor seed capsules and other plant material.

Another object of this invention is to provide a mechanical castor seed harvester, suited for one-man operation, that may be moved through a castor seed crop by a tractor or other power unit.

It is a further object of this invention to provide a harvester for castor seed that separates the capsules from the plant and from associated chaff and fibrous material before passing them to a suitable storage chamber from which they may be removed by gravity or an auger to a truck or other means of transportation or storage.

A still further object of this invention is to provide a means for removing castor seed from the plant with minimum damage to the plant fiber.

Another object is to provide a means of harvesting and preparing a castor seed crop for market that eliminates all necessity for manual contact with the poisonous seed product.

Further objects and advantages of the invention will be apparent from the appended description and drawings in which:

Fig. 5 is a fragmentary sectional view taken on line 5—5 of Fig. 1 of the bean elevating apparatus;

Fig. 7 is a side elevation in partial section showing the construction of the drive mechanism and a wheel and frame elevating mechanism.

Figure 1:
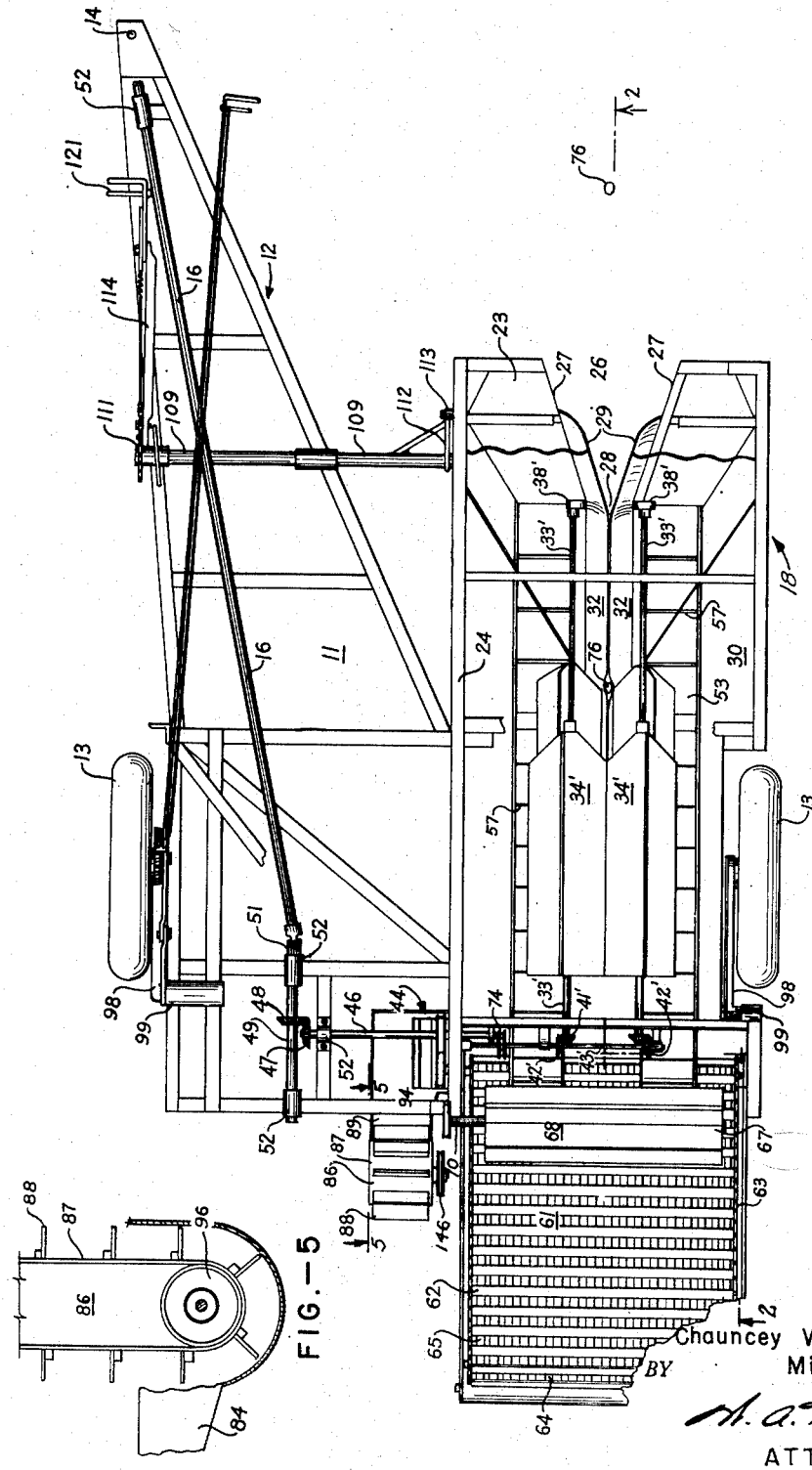
Fig. 1 is a top plan view in partial section showing an arrangement of parts.

The present invention provides a novel means for harvesting castor seed. To accomplish such purpose a harvesting unit is provided that may be moved along the crop rows behind a tractor or other motive power unit. The harvester is mounted on wheels and has adjustable mechanism for positioning the havester with respect to the height of the crop being processed. In general, the harvester unit itself consists of an enclosure providing a confined space having suitable openings therein to allow the entrance, travel through, and exit of the successive plants as the harvester is propelled down the crop row.

To prevent the loss of separated seed and to prevent damage to the seed as the plant enters or passes through the confined space all the above mentioned openings are provided with rubber or otherwise flexible or yieldable flaps that will open when the plant presses against them and which close after the plant has passed.

Within the confined space are opposed rotary stripping paddle units having flexible or yieldable surfaces thereon. In any case, the paddles are operated in pairs in the following manner. The paddles are arranged on opposite sides of the central opening in the confined space and are set on an incline which causes the lower part of the plant to make first contact. In addition, the paddles are rotated in opposite directions in such manner that the movement of each is directed upwardly against the plant, and outwardly away from the plant. Through this combination of incline and rotation, the action of the paddles tends to progress up the plant stripping it of its capsules and small fiber inclusions, but leaving the plant itself standing in the field.

When separated from the plant the seed pods and fibrous materials fall to the floor of the confined space where two endless conveyors pick them up and deliver them to the back of the confined space and to a higher elevation. On discharge from the floor conveyor the material is passed on to a second conveyor having raddles spaced thereon. This second conveyor agitates and further elevates the material to a position where it is subjected to further mechanical agitation by a threshing cylinder. Under the combined actions of the threshing cylinder and the raddles, all fibrous material is separated from the seed capsules, and the seed capsules and small fibrous materials fall through the raddle conveyor to an endless belt positioned below the raddle conveyor. The angle of incline of the endless belt is such that all fibrous material clings to the surface and is moved upwardly to a discharge position while all seed capsules roll down the belt and are collected on a transverse conveyor that delivers the seed to an elevator. The elevator in turn delivers the valuable product to an elevated hopper or bin in which it is collected for later delivery to a truck or other means of transportation or storage. Thus it will be apparent that the invention provides a unitary means and method for harvesting and preparing a castor seed product.

Referring now to the drawings, the operation and arrangement of a preferred embodiment of this invention will be described in detail. A harvester 11 having a frame 12 is mounted on wheels 13 and arranged to be moved through a field crop of castor seed plants. Harvester 11 may be drawn through the field by a tractor (not shown) attached to hitch 14 which is mounted on frame 12, and a power take-off of the tractor may be connected to a drive shaft 16 rotatably mounted in bearing support 52 carried on frame 12.

Figure 2:
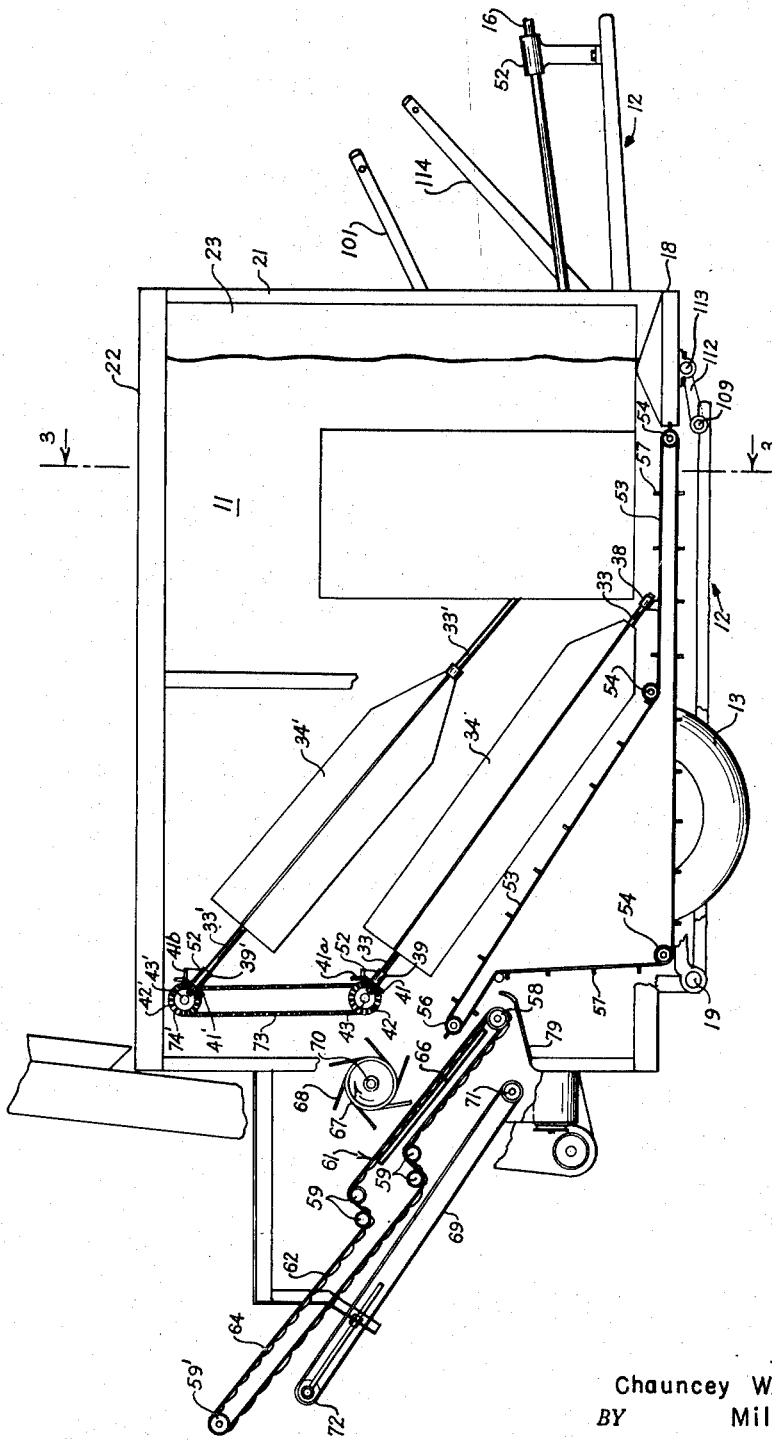
Fig. 2 is a sectional elevation through the harvester taken along the line 2—2 of Fig. 1.

A separate framework 18 is pivotally mounted on frame 12 by means of a rotatable shaft 19 as clearly shown in Fig. 2. Formed on framework 18 are upright members 21 and lengthwise or longitudinal members 22 and attached to said members are curtains 23 or other enclosure members to provide a substantially rectangular enclosure 24. Enclosure 24 has a recessed section 26 in its frontal wall having angularly disposed sides 27 to provide a narrowing passage or entrance leading to a frontal opening 28. Mounted in opening 28 are rubber or otherwise flexible members 29 to form a displaceable closure for opening 28.

Opening 28 communicates with a longitudinal bottom opening 31 running the length of enclosure 24 along bottom 30. Bottom opening 31 likewise has flexible members 32 supported on the separate sides of opening 31 and disposed upwardly from the point of support to a point of juncture with the opposite member 32. A similar opening (not shown) having similar closure members is provided at the rear of enclosure 24 to confine all harvested products against accidental spillage from enclosure 24.

Rotatable shafts 33 are positioned within enclosure 24 and mounted on an incline with respect to framework 18 so that the lower end is toward the front of enclosure 24. Said shafts have flexible or otherwise yieldable paddles 34 fastened to angle irons 36 which are in turn fastened to shafts 33 by bolts 37. Shafts 33 are mounted for rotation within lower support bearings 38 mounted on framework 18 and upper support bearings 39, mounted on support 41a. Bevel gears 41 only one of which is shown in the drawings mounted on the upper ends of shafts 33 are arranged for engagement with mating bevel gears 42 only one of which is shown in the drawings attached to a transverse power shaft 43 suitably mounted on enclosure 24 to rotate shafts 33 in opposite directions so that the motion of the paddles 34 will be toward the center of enclosure 24, upwardly to a point of contact, and outwardly away from the center.

Transverse power shaft 43 is connected through a drive mechanism 44 to a main power shaft 46 which, in turn, has a bevel gear 47 mating with gear 48 on jackshaft 49. Jackshaft 49 is connected to drive shaft 16 by means of a universal joint 51.

When the harvester is to be used in tall crops, a second pair of rotary paddles 34' is mounted within enclosure 24 in a position above rotary paddles 34. Upper paddles 34' are mounted on rotatable shafts 33' running in lower support bearings 38' suitably mounted on frame 18 and upper support bearings 39' suitably mounted on support member 41b, and having a bevel gear 41' on the upper ends of the shafts 33' and arranged for engagement with mating bevel gears 42'. A link chain 73 is arranged to pass over sprockets 74 and 74' fastened to transverse power shafts 43 and 43'. The method of attaching paddles 34' to shafts 33' is similar to that previously described for paddles 34.

Running along the bottom 30 of enclosure 24 on both sides of bottom opening 31 are individual conveyors 53 passing around idlers 54 and 54' and drive drums 56. Drive drum 56 is positioned at an elevation above bottom 30 and conveyors 53 have raised ridges 57 formed on their upper faces such that harvested material will be carried backwardly and upwardly along conveyors 53 when drive drum 56 is rotated. Rotation is imparted to drum 56 through its engagement in drive mechanism 44.

A drive drum 58 is positioned below and forward of drum 56 and held in engagement with drive mechanism 44. Threaded about drive drum 58 and idlers 59 and 59' is a raddle conveyor 61 formed of raddle slats 62 spaced apart a distance slightly greater than the dimension of a castor seed capsule and maintained in such relative position by chains 63 attached to the ends of raddle slats 62. Interconnecting raddle slats 62 and running in the same direction as chains 63 are a plurality of tapes 64. The idlers 59 over which raddle conveyor 61 passes are placed intermediate the ends of raddle conveyor 61 to cause a flexing of the conveyor 61 that will free entrained material.

Raddle conveyor 61 likewise delivers material backwardly and upwardly to a point of discharge though some material is allowed to fall through the opening 65 formed between slats 62 and tapes 64. However, in the lower portion of the raddle conveyor 61 material is prevented from passing through openings 65 by a plate 66 suitably mounted on enclosure 24 positioned below the top flight of raddle conveyor 61.

Located above plate 66 and raddle conveyor 61 is a threshing cylinder 67 having flexible rubbing strips 68 attached thereto. Threshing cylinder 67 is so positioned that rubbing strips 68 will rub against raddle slats 62 or any material on raddle conveyor 61 when cylinder 67 is rotated in the direction indicated. Threshing cylinder 67 is mounted on a cylinder shaft 70 likewise connected to drive mechanism 44.

A flat belt conveyor 69 is positioned below raddle conveyor 61 and drive drum 71 and idler 72 over which it passes are so positioned as to cause conveyor 69 to be on an incline with respect to framework 18. The operation of further parts will be described in connection with the operation of the harvester.

Figure 3:
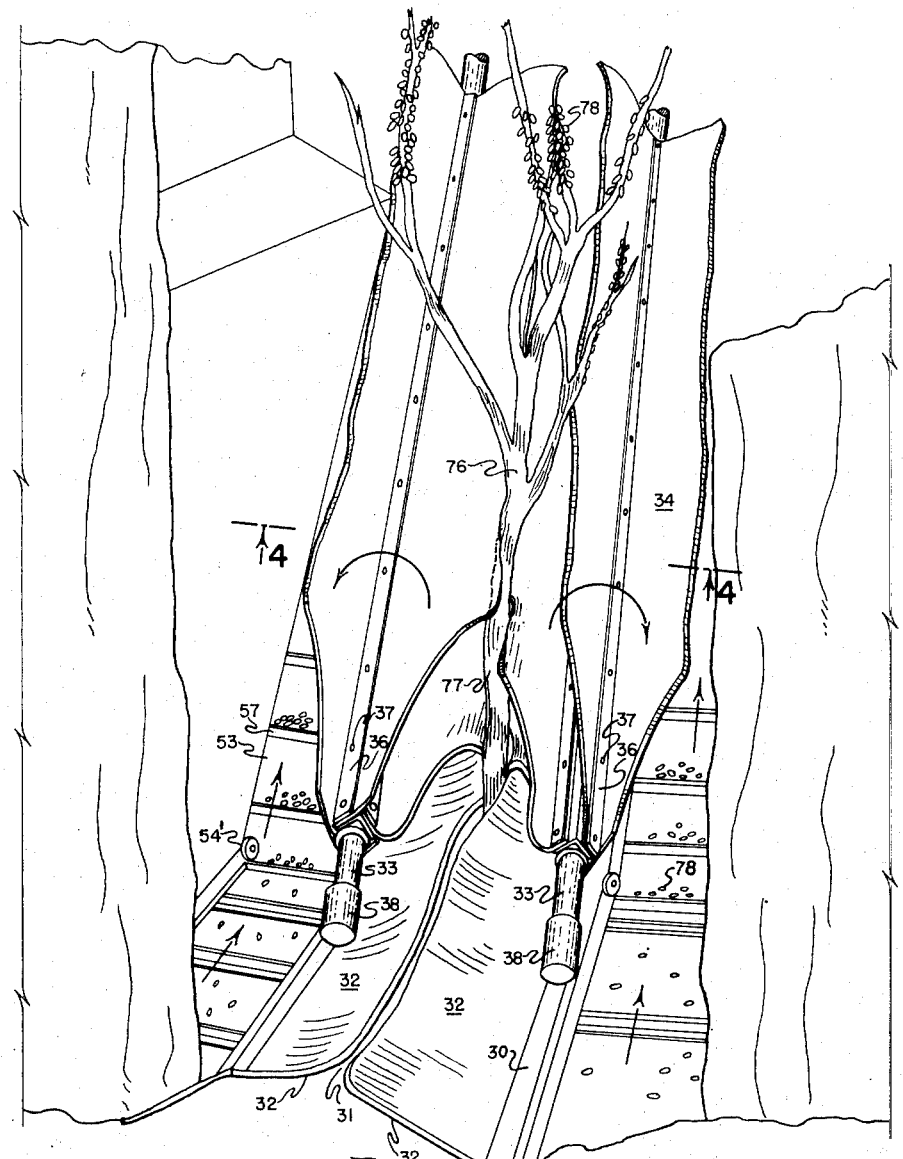
Fig. 3 is an enlarged fragmentary sectional front elevation taken along the line 3—3 of Fig. 2 and showing a castor bean plant between the rotary paddles.
Figure 4:
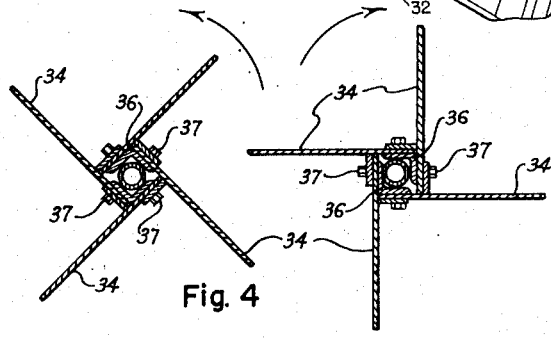
Fig. 4 is a cross sectional view taken along the line 4—4 of Fig. 3 perpendicular to the axis of the rotary paddles and showing the construction of the paddles.
Figure 6:
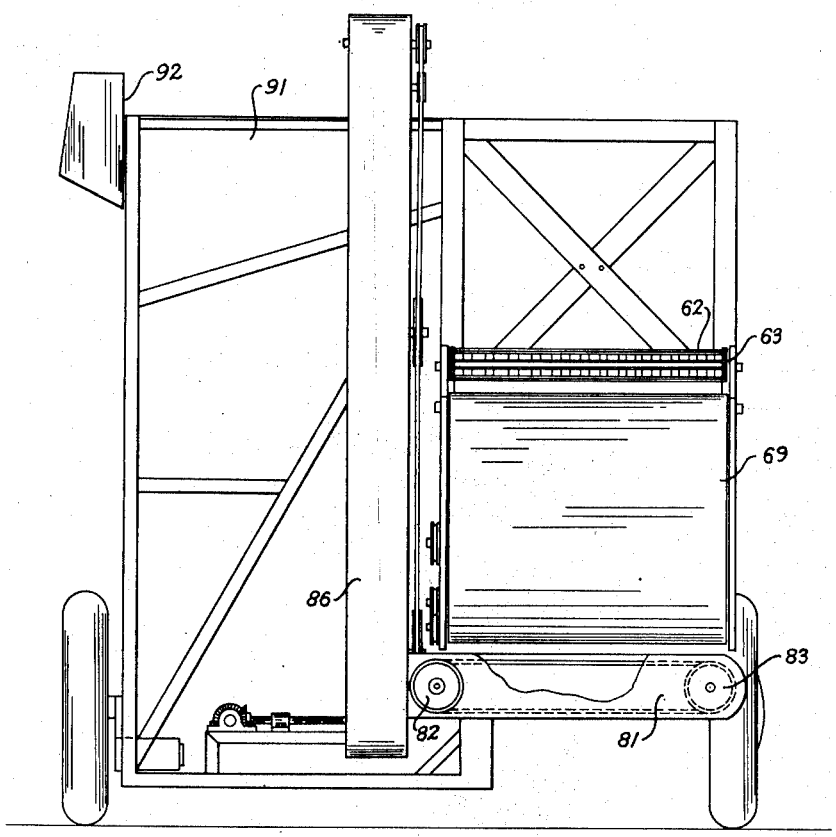
Fig. 6 is a rear elevation of the harvester showing a hopper in position to receive the beans discharged from the elevating mechanism.

In operation, harvester 11 is drawn through a field of castor seed plants 76 arranged in rows with the center line of enclosure 24 passing along the rows of castor seed plants 76. As harvester 11 is drawn through the field the castor seed plants 76 are received into the recessed section 26 comprising the entrance and are guided by flexible members 29 through frontal opening 28. The stock 77 of the plant 76 passes between bottom flexible members 32 which open to allow passage of the stock and then close behind it. Likewise flexible members 29 close after the castor seed plant 76 has passed through the opening. Further forward motion of harvester 11 draws paddles 34 into engagement with the plant in a manner shown in Fig. 3. Since paddles 34 are arranged on an incline with the front end being at the lower elevation, the plant 76 is subjected to a rotary stripping action directed against the plant from the stock 77 upwardly to the top of the plant. As paddles 34 rotate toward the stock 77, upwardly against it and away from it at the top, castor seed capsules 78 are separated from the stock 77. Capsules 78, together with minor inclusions of fibrous material and chaff, fall to conveyors 53 on either side of bottom opening 31. Conveyors 53 move the material upwardly and backwardly until they are dumped over onto raddle conveyor 61. Conveyor 61 moves the castor seed capsules 78 and the separated materials upwardly along plate 66. While moving upwardly the bean pods are subjected to abrasion and agitation through the action of raddle slats 62 passing over plate 66.

Near the upper extremity of plate 66 the seed capsules 78 and associated materials are subjected to a threshing action caused by the rotation of threshing cylinder 67 which drives rubbing strips 68 against the material on conveyor 61. The action imparted by threshing cylinder 67 is one of agitation and abrasion. As a result of such action, the fibrous material of the spike which is attached to the seed capsules 78 and other chaff is separated from capsules 78 leaving them in a clean condition. As conveyor 61 moves the capsules, chaff and fibrous material further up the incline, the conveyor passes beyond the extremity of plate 66. At this point capsules, chaff and small fibrous materials fall through openings 65 between raddle slats 62. When conveyor 61 passes over the intermediate idlers 59 raddle slats 62 are flexed, causing any entrained capsules or fibrous materials to be loosened. As conveyor 61 passes further up the incline any such entrained materials will pass through openings 65. While openings 65 are arranged to be of such size that capsules will readily pass between slats 62, the tapes 64, though separated by a greater distance than are slats 62, are arranged to prevent the passing of any long pieces of fibrous material.

On falling through openings 65 capsules 78, chaff, and small fibrous materials are received on flat belt conveyor 69. Conveyor 69 is arranged on an incline such that fibrous materials and chaff will cling to conveyor 69, but the substantially round capsules will roll down conveyor 69 and be received in a feed hopper 79 below drive drum 71. It will be observed that any large or long inclusions of fibrous material will be dumped at the upper end of raddle conveyor 61 while small inclusions of chaff or fibrous material will be dumped over the upper end of conveyor 69.

The capsules received in feed hopper 79 are fed to a transverse conveyor 81 moving about drive pulley 82 and idler 83. Transverse conveyor 81 delivers the capsules 78 to a feeder 84 arranged to feed such capsules 78 into a substantially vertical elevator 86 designed to prevent cracking or bruising the seed capsules. For this purpose, elevator 86 is made up of a flexible belt 87 having flexible flights 88 arranged on the outer surface thereof. Capsules 78 are carried by flexible flights 88 up the elevator 86 to a discharge chute 89. Chute 89 delivers the capsules 78 to an elevated storage hopper 91. Storage hopper 91 is provided with a bin gate 92 that may be opened to discharge the capsules 78 into a waiting truck or other means of transportation.

One form of drive mechanism 44 previously referred to is shown in Fig. 7. In Fig. 7 the main drive pulley 93 mounted on driven shaft 46 (more clearly shown in Fig. 1 of the drawings) is operatively connected through the series of drive belts 130, 132, 134 and 136 to pulleys 137, 138, 140, 142, 144 and 146. These pulleys drive shafts 150, 148, 43, 70, 152, and 153, respectively, which shafts are connected to drum 58, drum 56, gear 42, cylinder 67, drum 71, and drive pulley 146, respectively.

For purposes of positioning harvester 11 with respect to the height of a castor seed crop, a frame elevating mechanism is provided. Wheels 13 are attached to frame 12 by means of arms 98. Arms 98 are arranged to pivot in bearings 99 mounted on frame 12. A lever 101 is attached to one of the arms 98 in such manner that moving lever 101 will cause arms 98 to rotate in bearing 99, thereby raising or lowering frame 12 with respect to the ground level. For purposes of maintaining arms 98 in the desired position, lever 101 is associated with a notched ratchet member 102 fixably mounted on frame 12. A lock 103 pivotally mounted on lever 101 is arranged for selective engagement in the notches 104 of ratchet 102. For the purposes of releasing lock 103 a handle 105 is provided at the extremity of lever 101 and a rod 106 interconnects handle 105 and lock 103. Lock 103 is urged into engagement with the notches 104 of ratchet 102 by a spring 107.

A further lever actuated mechanism is provided to position framework 18 on frame 12. This mechanism consists of a shaft 109 mounted in bearings 111 supported on frame 12. Eccentric arms 112 are attached to shaft 109 and pivotally attached to frame 12 by means of bolts 113. An outer extremity of shaft 109 is attached to the end of a lever 114. Lever 114 is associated with a ratchet member 116 fixedly attached to frame 12. Ratchet member 116 has notches 117 formed thereon for engagement with a lock member 118 mounted on lever 114. Lock member 118 is connected to a rod 119 and a handle 121 in a manner similar to the arrangement described for lever 101. Spring 122 urges lock member 118 into engagement with notches 117 of ratchet member 116. When lock member 118 is disengaged and lever 114 is rotated, framework 18 will be elevated or lowered with respect to frame 12, thereby allowing a positioning of paddles 34 with respect to the castor seed plants 76 passing through harvester 11.

While a preferred embodiment of this invention has been shown and described it will be evident that the invention described in this application is adaptable to different forms than that shown or described and to other uses than that set forth. For instance, the invention in its present form could be modified to harvest other crops such as sunflowers, safflowers, winter onions or other similar plants which bear a seed pod or flower that must be stripped from the stock. It is intended that this application is to be limited only by the showings of the prior art and the limitations set forth in the appended claims:

What is claimed is:

1. A harvester for stripping seeds or the like comprising a mobile support having at least one substantially U-shaped plant receiving opening therein, plant gathering means at the forward end of the opening, at least one pair of opposed inclined shafts mounted for rotation one on each side and above said opening with the lower end of the shafts toward the plant gathering means, each of the shafts carrying a plurality of flexible stripper sheet members, said flexible stripper sheet members extending outwardly from each shaft into substantially contacting relation with the stripper sheet members of the complementary shaft throughout their length, means for rotating said shafts in opposite directions as the harvester progresses along a row of plants whereby the flexible stripper sheet members strip the seeds from the plants, and seed receiving enclosures positioned along each side of the opening below the axis of rotation of the shafts, said seed receiving enclosures being at least longitudinally coextensive with the flexible stripper sheet members.

2. A harvester for stripping seeds or the like comprising a mobile support having at least one substantially U-shaped plant receiving opening therein, flexible flaps carried by said support adapted to provide a displaceable closure for at least the lower longitudinal extent of said U-shaped opening, plant gathering means at the forward end of the opening, at least one pair of opposed inclined shafts mounted for rotation one on each side and above the flexible flaps with the lower end of the shafts toward the plant gathering means, each of the shafts carrying a plurality of flexible stripper sheet members, said flexible stripper sheet members extending outwardly from each shaft into substantially contacting relation with the stripper sheet members of the complementary shaft throughout their length, means for rotating said shafts in opposite directions as the harvester progresses along a row of plants whereby the flexible stripper sheet members strip the seeds from the plants, and seed receiving enclosures positioned along each side of the U-shaped opening below the axis of rotation of the shafts, said seed receiving enclosures being at least longitudinally coextensive with the flexible stripper sheet members.

3. A harvester for stripping seeds or the like as defined in claim 2 wherein the flexible flaps and the flexible stripper sheets comprise sheets of rubber.

4. A harvester for stripping seeds or the like comprising a mobile support having at least one substantially U-shaped plant receiving opening therein, plant gathering means at the forward end of the opening, at least one pair of opposed inclined shafts mounted for rotation one on each side and above said opening with the lower end of the shafts toward the plant gathering means, each of the shafts carrying a plurality of flexible stripper sheet members, said flexible stripper sheet members extending outwardly from each shaft into substantially contacting relation with the stripper sheet members of the complementary shaft throughout their length, means for rotating said shafts in opposite directions as the harvester progresses along a row of plants whereby the flexible stripper sheet members strip the seeds from the plants, seed receiving enclosures positioned along each side of the opening below the axis of rotation of the shafts, said seed receiving enclosures being at least longitudinally coextensive with the flexible stripper sheet members, and flexible flaps secured about said U-shaped opening to provide a displaceable closure therefor.

5. A harvester for stripping seeds or the like comprising a mobile support having a substantially U-shaped plant receiving opening therein, plant gathering means at the forward end of said opening, a first pair of opposed inclined shafts mounted for rotation one on each side and above said opening with the lower end of the shafts toward the plant gathering means, a second pair of opposed inclined shafts mounted for rotation above and parallel to said first pair of shafts, each of the shafts carrying a plurality of flexible stripper sheet members, said flexible stripper sheet members extending outwardly from each shaft into contacting relation with the stripper sheet members of the complementary shafts of each pair throughout their length, means for rotating the complementary shafts of each pair in opposite directions as the harvester progresses along a row of plants whereby the flexible stripper sheet members strip the seeds from the plants, seed receiving enclosures positioned along each side of the opening below the axis of rotation of the first pair of shafts, said seed receiving enclosures being at least longitudinally coextensive with the flexible stripper sheet members and flexible flaps secured about said U-shaped opening to provide a displaceable closure therefor.

CHAUNCEY W. SMITH.
MILO F. ARMS.

References Cited in the file of this patent

UNITED STATES PATENTS

| Number | Name | Date |
|---|---|---|
| 371,372 | Savage | Oct. 11, 1887 |
| 517,865 | Keeling | Apr. 10, 1894 |
| 541,992 | Cloud et al. | July 2, 1895 |
| 912,610 | Peterson | Feb. 16, 1909 |
| 1,069,997 | Appleby | Aug. 12, 1913 |
| 1,123,601 | Scheble | Jan. 5, 1915 |
| 1,172,665 | Beebe et al. | Feb. 22, 1916 |
| 1,181,018 | Lamb | Apr. 25, 1916 |
| 1,263,233 | Habeck | Apr. 16, 1918 |
| 1,401,829 | Swindell | Dec. 27, 1921 |
| 1,429,168 | Scott | Sept. 12, 1922 |
| 1,621,194 | Elder | Mar. 15, 1927 |
| 1,727,431 | Herr et al. | Sept. 10, 1929 |
| 1,767,979 | Hestand | June 24, 1930 |
| 1,814,305 | Fleming | July 14, 1931 |
| 1,823,387 | Campbell | Sept. 15, 1931 |
| 1,938,264 | Templeton | Dec. 5, 1933 |
| 1,948,975 | Urschel | Feb. 27, 1934 |
| 2,114,263 | Heaslet | Apr. 12, 1938 |
| 2,180,594 | Kuhlman | Nov. 21, 1939 |
| 2,183,439 | Achatz | Dec. 12, 1939 |
| 2,199,488 | Fleming | May 7, 1940 |
| 2,227,225 | Lackey | Dec. 31, 1940 |
| 2,252,159 | Blank | Aug. 12, 1941 |
| 2,278,394 | Walters | Mar. 31, 1942 |
| 2,292,650 | Oehler et al. | Aug. 11, 1942 |
| 2,403,638 | Clark | July 9, 1946 |
| 2,412,002 | Nelson et al. | Dec. 3, 1946 |
| 2,429,560 | Metzger | Oct. 21, 1947 |
| 2,466,089 | Esch | Apr. 5, 1949 |